United States Patent
Akitomi

(10) Patent No.: US 10,241,969 B2
(45) Date of Patent: Mar. 26, 2019

(54) DATA PROCESSING SYSTEM AND DATA PROCESSING METHOD

(71) Applicant: HITACHI, LTD., Tokyo (JP)

(72) Inventor: Tomoaki Akitomi, Tokyo (JP)

(73) Assignee: HITACHI, LTD., Tokyo (JP)

( * ) Notice: Subject to any disclaimer, the term of this patent is extended or adjusted under 35 U.S.C. 154(b) by 102 days.

(21) Appl. No.: 15/504,431

(22) PCT Filed: Aug. 18, 2014

(86) PCT No.: PCT/JP2014/071519
§ 371 (c)(1),
(2) Date: Feb. 16, 2017

(87) PCT Pub. No.: WO2016/027297
PCT Pub. Date: Feb. 25, 2016

(65) Prior Publication Data
US 2017/0235704 A1   Aug. 17, 2017

(51) Int. Cl.
*G06F 17/15* (2006.01)
*G06F 17/18* (2006.01)
*G06K 9/00* (2006.01)

(52) U.S. Cl.
CPC .............. *G06F 17/15* (2013.01); *G06F 17/18* (2013.01); *G06K 9/00* (2013.01)

(58) Field of Classification Search
CPC ............ G06F 17/18; G06F 17/15; G06K 9/00
USPC ......................................................... 708/422
See application file for complete search history.

(56) References Cited

U.S. PATENT DOCUMENTS

| 5,528,730 A * | 6/1996 | Yagi ................... G05B 13/0275 706/52 |
| 2002/0110269 A1* | 8/2002 | Floeder .................. G01N 21/89 382/141 |
| 2004/0220770 A1* | 11/2004 | Isumi .................... G06T 7/0008 702/179 |
| 2006/0212230 A1 | 9/2006 | Yamakawa et al. |

(Continued)

FOREIGN PATENT DOCUMENTS

| JP | 07-105382 A | 4/1995 |
| JP | 2003-318985 A | 11/2003 |

(Continued)

*Primary Examiner* — Tan V Mai
(74) *Attorney, Agent, or Firm* — Volpe and Koenig, P.C.

(57) ABSTRACT

A data processing system that calculates a correlation coefficient between multiple variables includes a storage unit in which a table in which multiple correlation coefficients are stored is stored, a first selection unit that makes a selection to determine whether or not calculation of a first correlation coefficient that is a correlation coefficient between a first variable and a second variable is indispensable, a second selection unit that selects a third variable which is a variable that results from storing in the table a second correlation coefficient that is a correlation coefficient representing a relationship with the first variable, and a third correlation coefficient that is a correlation coefficient representing a relationship with the second variable, and a first determination unit that determines whether or not the calculation of the first correlation coefficient is indispensable, based on the second correlation coefficient and the third correlation coefficient.

7 Claims, 12 Drawing Sheets

(56) References Cited

U.S. PATENT DOCUMENTS

2008/0091471 A1* 4/2008 Michon .................. G06Q 40/08
                                                        705/3
2011/0087773 A1   4/2011 Ishioka

FOREIGN PATENT DOCUMENTS

| JP | 2006-260073 A | 9/2006 |
| JP | 2011-086062 A | 4/2011 |

* cited by examiner

[Fig. 1]
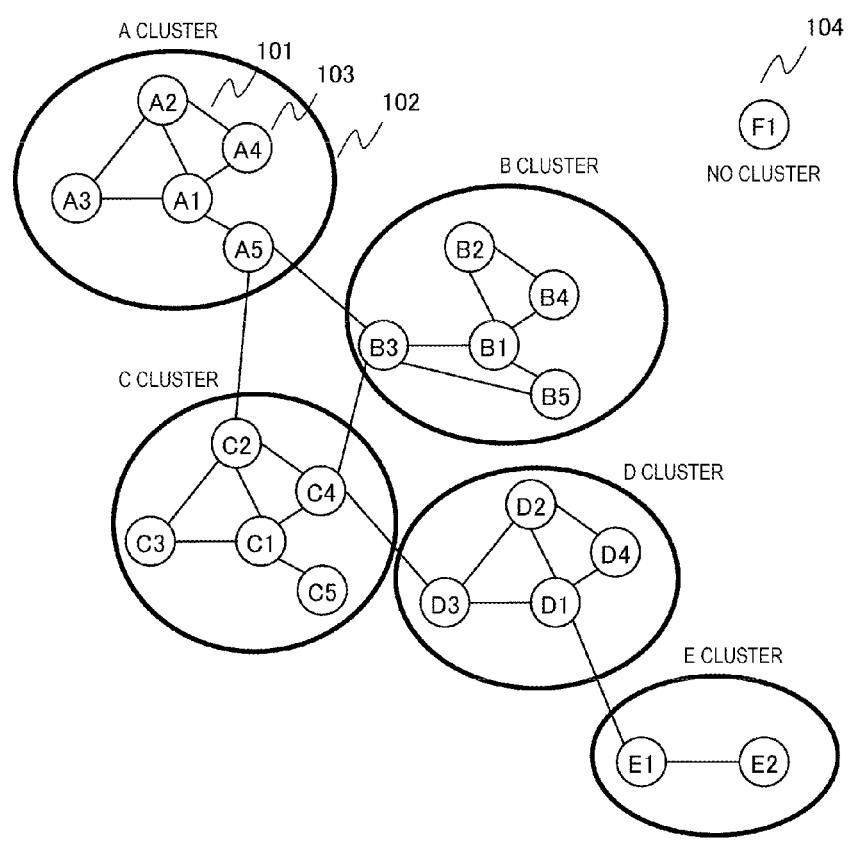

[Fig. 2]

[Fig. 3]
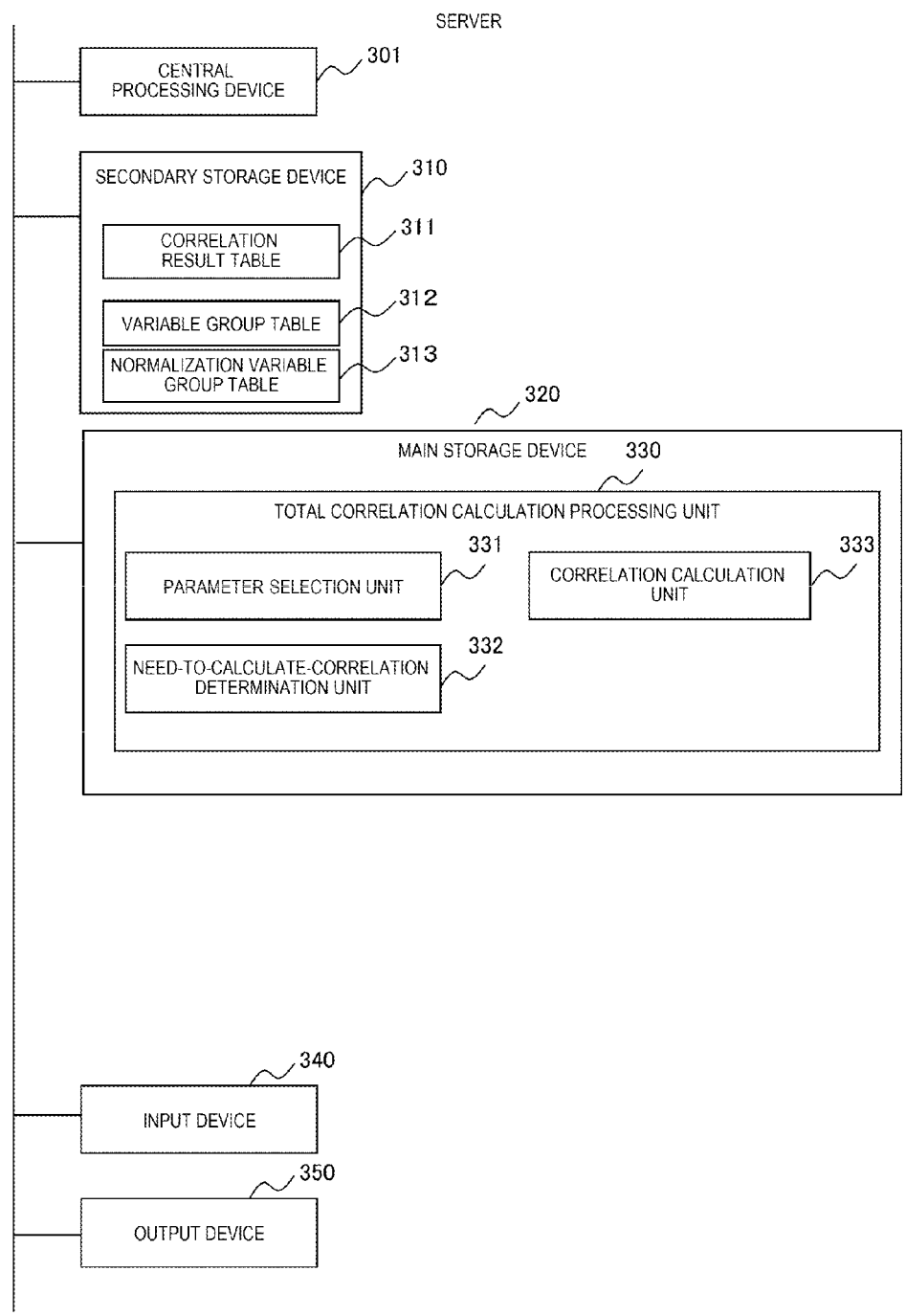

[Fig. 4]
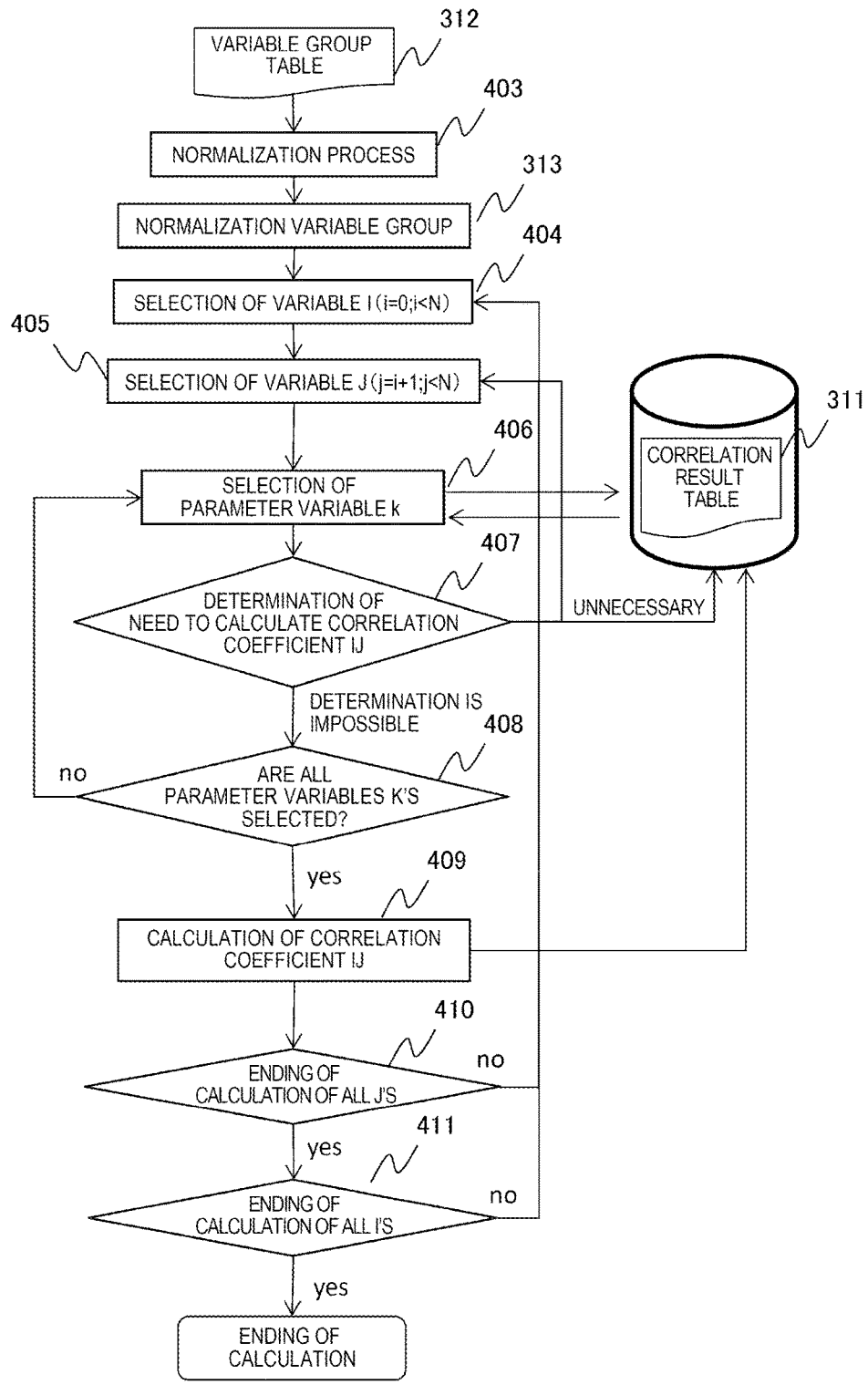

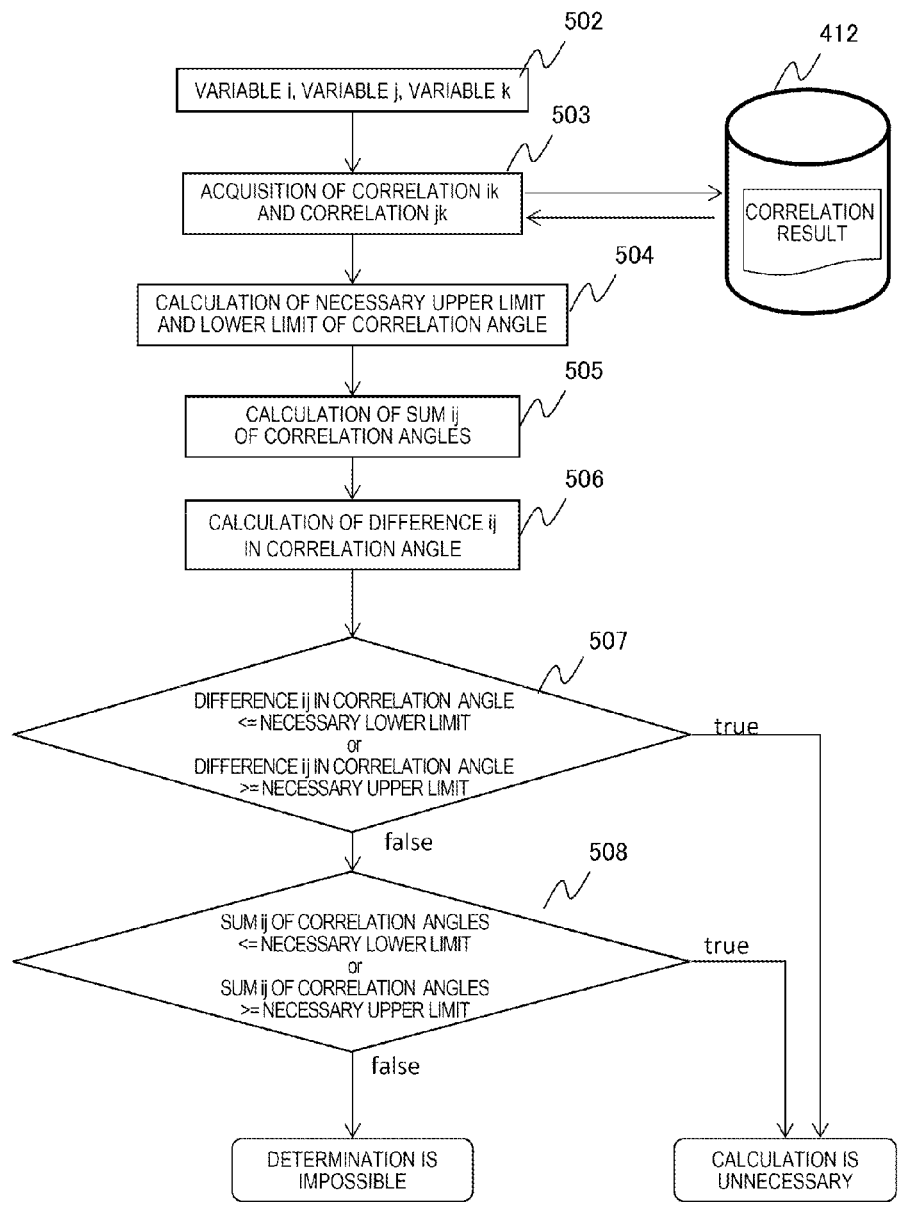
[Fig. 5]

| A1 | A2 | A3 | ... | E2 | F1 |
|---|---|---|---|---|---|
| 0.94 | 402.00 | 6.43 | ... | 3.51 | 0.05 |
| 0.33 | 401.00 | 20.80 | ... | 0.05 | 0.00 |
| 0.41 | 237.00 | 6.00 | ... | 1.20 | 0.10 |
| 0.17 | 680.00 | 5.07 | ... | 9.92 | 0.04 |
| 0.10 | 74.00 | 23.17 | ... | 5.54 | 0.09 |
| 0.46 | 500.00 | 15.23 | ... | 0.24 | 0.05 |
| 0.79 | 10.00 | 1.17 | ... | 3.15 | 0.07 |
| 0.98 | 711.00 | 32.93 | ... | 1.86 | 0.01 |
| ... | ... | ... | ... | ... | ... |

| A1 | A2 | A3 | ... | E2 | F1 |
|---|---|---|---|---|---|
| 0.57 | 0.07 | −0.3 | ... | −0.14 | 0 |
| −0.12 | 0.07 | 0.15 | ... | −0.49 | −0.5 |
| −0.03 | −0.16 | −0.31 | ... | −0.38 | 0.5 |
| −0.31 | 0.47 | −0.34 | ... | 0.51 | −0.1 |
| −0.39 | −0.39 | 0.23 | ... | 0.06 | 0.4 |
| 0.02 | 0.21 | −0.02 | ... | −0.48 | 0 |
| 0.4 | −0.49 | −0.46 | ... | −0.18 | 0.2 |
| 0.61 | 0.51 | 0.54 | ... | −0.31 | −0.4 |
| ... | ... | ... | ... | ... | ... |

[Fig. 8]

| | A1 | A2 | A3 | A4 | A5 | B1 | B2 | B3 | B4 | B5 | C1 | C2 | C3 | C4 | C5 | D1 | D2 | D3 | D4 | E1 | E2 | F1 |
|---|---|---|---|---|---|---|---|---|---|---|---|---|---|---|---|---|---|---|---|---|---|---|
| A1 | 1.00 | 0.77 | 0.84 | 0.62 | 0.76 | 0.16 | 0.02 | 0.03 | 0.19 | 0.14 | 0.01 | 0.13 | 0.19 | 0.19 | 0.17 | 0.17 | 0.19 | 0.05 | 0.19 | 0.17 | 0.06 | 0.11 |
| A2 | | 1.00 | 0.51 | 0.89 | 0.04 | 0.08 | 0.06 | - | - | - | - | - | - | - | - | - | - | - | - | - | - | - |
| A3 | | | 1.00 | 0.16 | 0.06 | 0.06 | - | - | - | - | - | - | - | - | - | - | - | - | - | - | - | - |
| A4 | | | | 1.00 | 0.09 | 0.08 | 0.19 | - | - | - | - | - | - | - | - | - | - | - | - | - | - | - |
| A5 | | | | | 1.00 | 1.00 | 0.73 | 0.78 | 0.58 | 0.00 | 0.06 | 0.67 | 0.10 | - | - | - | - | - | - | - | - | - |
| B1 | | | | | | 1.00 | 1.00 | 0.74 | 0.70 | 0.84 | 0.11 | 0.01 | 0.02 | - | - | - | - | - | - | - | - | - |
| B2 | | | | | | | 1.00 | 1.00 | 0.01 | 0.11 | 0.20 | 0.19 | 0.05 | - | - | - | - | - | - | - | - | - |
| B3 | | | | | | | | 1.00 | 1.00 | 0.51 | 0.19 | 0.15 | 0.06 | 0.55 | 0.13 | - | - | - | - | - | - | - |
| B4 | | | | | | | | | 1.00 | 0.08 | 0.06 | 0.63 | 0.79 | 0.75 | - | - | - | - | - | - | - | - |
| B5 | | | | | | | | | | 1.00 | 1.00 | - | - | - | - | - | - | - | - | - | - | - |
| C1 | | | | | | | | | | | 1.00 | 1.00 | - | - | - | - | - | - | - | - | - | - |
| C2 | | | | | | | | | | | | 1.00 | 1.00 | - | - | - | - | - | - | - | - | - |
| C3 | | | | | | | | | | | | | 1.00 | 1.00 | - | - | - | - | - | - | - | - |
| C4 | | | | | | | | | | | | | | 1.00 | 1.00 | - | - | - | - | - | - | - |
| C5 | | | | | | | | | | | | | | | 1.00 | - | - | - | - | - | - | - |
| D1 | | | | | | | | | | | | | | | | 1.00 | - | - | - | - | - | - |
| D2 | | | | | | | | | | | | | | | | | 1.00 | - | - | - | - | - |
| D3 | | | | | | | | | | | | | | | | | | 1.00 | - | - | - | - |
| D4 | | | | | | | | | | | | | | | | | | | 1.00 | - | - | - |
| E1 | | | | | | | | | | | | | | | | | | | | 1.00 | - | - |
| E2 | | | | | | | | | | | | | | | | | | | | | 1.00 | - |
| F1 | | | | | | | | | | | | | | | | | | | | | | 1.00 |

[Fig. 9]

|    | A1   | A2   | A3   | A4   | A5   | B1   | B2   | B3   | B4   | B5   | C1   | C2   | C3   | C4   | C5   | D1   | D2   | D3   | D4   | E1   | E2   | F1   |
|----|------|------|------|------|------|------|------|------|------|------|------|------|------|------|------|------|------|------|------|------|------|------|
| A1 | 1.00 | 0.77 | 0.84 | 0.62 | 0.76 | 0.16 | 0.02 | 0.03 | 0.19 | 0.14 | 0.01 | 0.13 | 0.19 | 0.15 | 0.17 | 0.13 | 0.19 | 0.05 | 0.19 | 0.17 | 0.06 | 0.11 |
| A2 |      | 1.00 | 0.51 | 0.89 | 0.04 | –    | –    | –    | –    | –    | –    | –    | –    | –    | –    | –    | –    | –    | –    | –    | –    | –    |
| A3 |      |      | 1.00 | 0.16 | 0.06 | 0.06 | 0.06 | –    | –    | –    | –    | –    | –    | –    | –    | –    | –    | –    | –    | –    | –    | –    |
| A4 |      |      |      | 1.00 | 0.09 | 0.08 | –    | –    | –    | –    | –    | –    | –    | –    | –    | –    | –    | –    | –    | –    | –    | –    |
| A5 |      |      |      |      | 1.00 | –    | –    | –    | –    | –    | –    | –    | –    | –    | –    | –    | –    | –    | –    | –    | –    | –    |
| B1 |      |      |      |      |      | 1.00 | 0.73 | 0.78 | 0.58 | 0.84 | 0.06 | 0.67 | 0.10 | –    | –    | –    | –    | –    | –    | –    | –    | –    |
| B2 |      |      |      |      |      |      | 1.00 | 0.74 | 0.70 | 0.11 | 0.11 | 0.01 | 0.02 | –    | –    | –    | –    | –    | –    | –    | –    | –    |
| B3 |      |      |      |      |      |      |      | 1.00 | 0.02 | 0.51 | 0.20 | 0.19 | 0.05 | –    | –    | –    | –    | –    | –    | –    | –    | –    |
| B4 |      |      |      |      |      |      |      |      | 1.00 | 0.08 | 0.19 | 0.15 | 0.06 | 0.55 | 0.13 | –    | –    | –    | –    | –    | –    | –    |
| B5 |      |      |      |      |      |      |      |      |      | 1.00 | 0.06 | –    | –    | –    | –    | –    | –    | –    | –    | –    | –    | –    |
| C1 |      |      |      |      |      |      |      |      |      |      | 1.00 | 0.63 | 0.79 | 0.79 | 0.79 | 0.07 | –    | –    | –    | –    | –    | –    |
| C2 |      |      |      |      |      |      |      |      |      |      |      | 1.00 | 0.51 | 0.75 | 0.16 | 0.00 | –    | –    | –    | –    | –    | –    |
| C3 |      |      |      |      |      |      |      |      |      |      |      |      | 1.00 | 0.81 | 0.02 | 0.19 | 0.19 | 0.63 | 0.18 | 0.12 | 0.18 | 0.12 |
| C4 |      |      |      |      |      |      |      |      |      |      |      |      |      | 1.00 | 0.05 | 0.12 | 0.70 | 0.54 | 0.64 | 0.57 | –    | –    |
| C5 |      |      |      |      |      |      |      |      |      |      |      |      |      |      | 1.00 | 1.00 | 1.00 | 0.69 | 0.80 | 0.17 | –    | –    |
| D1 |      |      |      |      |      |      |      |      |      |      |      |      |      |      |      |      | 1.00 | 1.00 | 0.14 | 0.09 | –    | –    |
| D2 |      |      |      |      |      |      |      |      |      |      |      |      |      |      |      |      |      |      | 1.00 | 0.04 | 0.86 | –    |
| D3 |      |      |      |      |      |      |      |      |      |      |      |      |      |      |      |      |      |      |      | 1.00 | 1.00 | –    |
| D4 |      |      |      |      |      |      |      |      |      |      |      |      |      |      |      |      |      |      |      |      |      | 1.00 |

[Fig. 10]
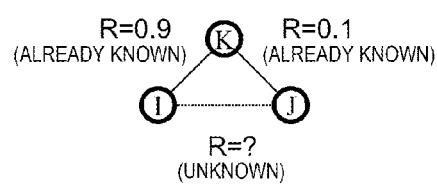
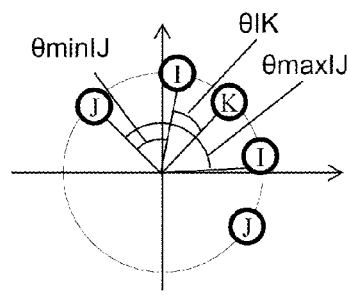
(A) ESTIMATION OF CORRELATION IJ
THAT USES PARAMETER VARIABLE K
(B) MAXIMUM VALUE AND
MINIMUM VALUE OF CORRELATION IJ

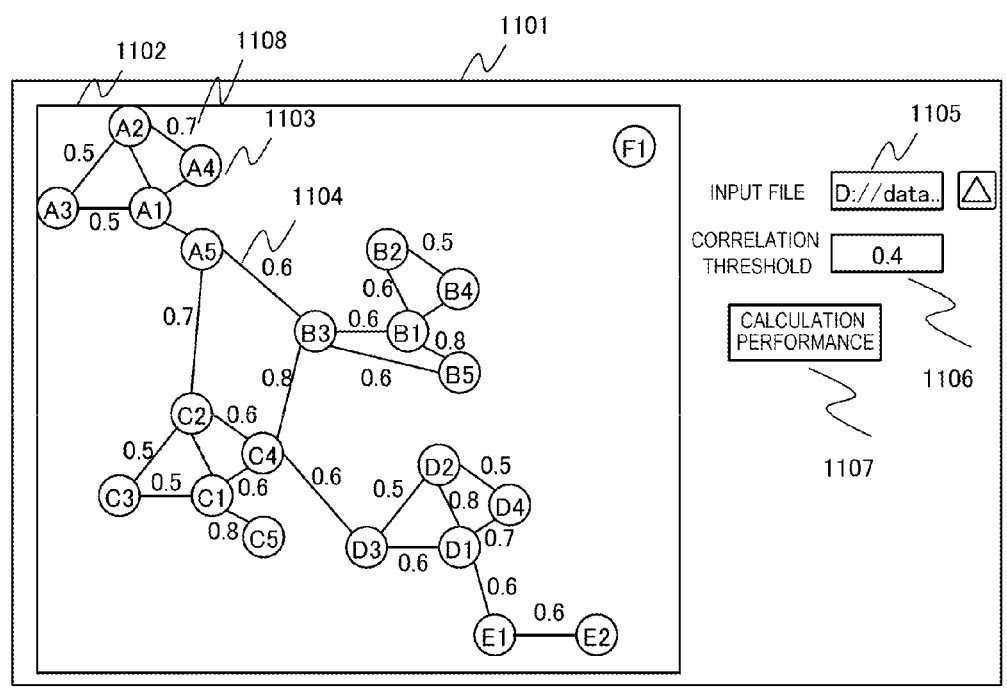
[Fig. 11]

[Fig. 12]
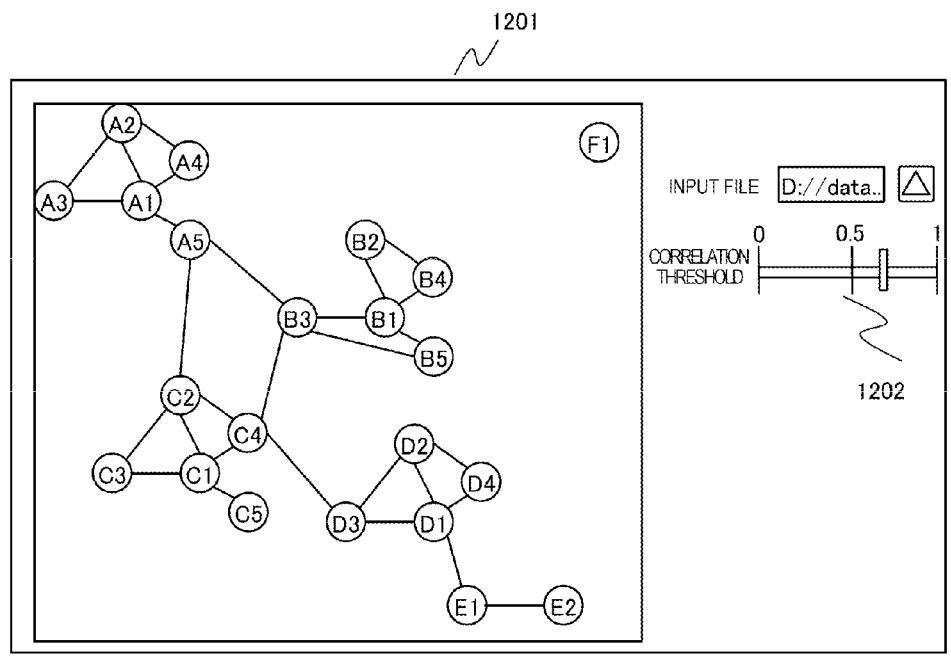

[Fig. 13]
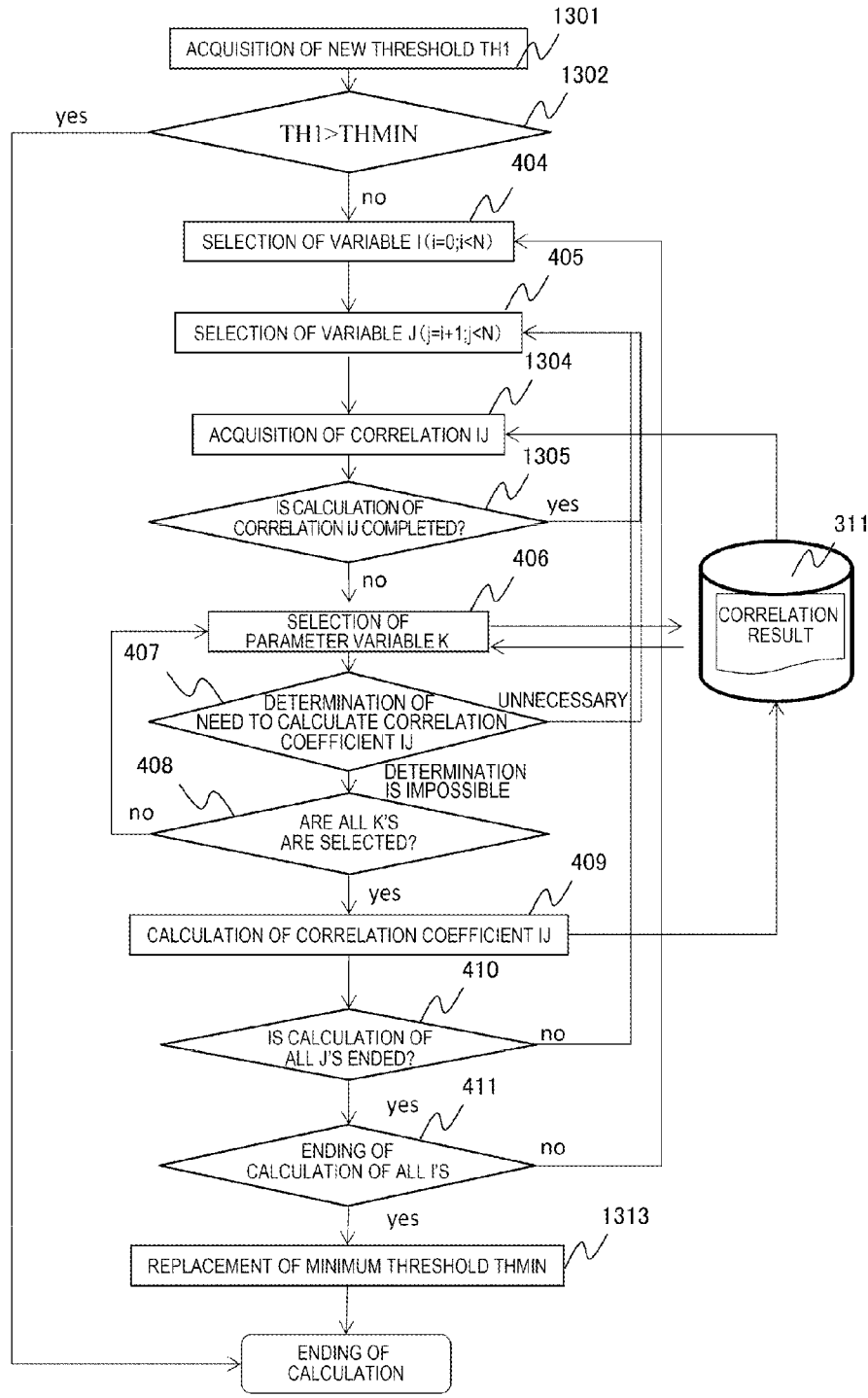

DATA PROCESSING SYSTEM AND DATA PROCESSING METHOD

TECHNICAL FIELD

The present invention relates to a technology in which a pair of variables that have a high level of correlation is extracted at a high speed in order to make clear a relationship between variables with regard to data that includes many variables.

BACKGROUND ART

In recent years, technologies have been developed that make clear relationships among large amounts of information in society, which is called BIG DATA. As the most basic method of making clear the relationships among large amounts of information, for example, there is a technology that is disclosed in PTL 1. In PTL 1, a user set S is specified, a network diagram is created by calculating similarities among user sets S, and the relationships among the user sets are visualized.

Furthermore, in PTL 2, as a technology that reduces the time taken to calculate a correlation coefficient, a technology is disclosed that shortens the time taken to calculate a correlation coefficient by limiting a region that is used for correlation calculation and obtaining the correlation coefficient without using all pieces of data among the variables.

CITATION LIST

Patent Literature

PTL 1: JP-A-2011-86062
PTL 2: JP-A-7-105382

SUMMARY OF INVENTION

Technical Problem

At this point, the inventor in the present application studied a correlation network that is illustrated in FIG. 1. The correlation network relating to FIG. 1 is an expression method in which, in a case where there is a strong relationship between variables, as a node that causes each variable to be illustrated by 103, a link that is illustrated by 101 is attached. With the correlation network, a cluster that is made from multiple variables as illustrated by 102, or data other than the cluster, which has no relationship with any variable, as illustrated by 104, is visually read.

In order to create the correlation network, generally, a method of expressing the strength of the relationship between variables with the correlation coefficient is used. In this case, in order to create the correlation network, there is a need to generate a correlation table 201 in advance as illustrated in FIG. 2. However, in a case where all correlations coefficients between variables are assumed to be obtained, there is a problem in that the greater the number of variables, the more the calculation time increases with O (N^2).

At this point, the correlation coefficient between each variable is stored in the correlation table 201 in FIG. 2, and correlation coefficients in a pair, each of which is at or above a threshold, are connected with each other with a link. For example, when a threshold is assumed to be 0.5, because a correlation coefficient between A1 and A2 is at or above the threshold, A1 and A2 in FIG. 1 are connected to each other with a link. For this reason, any correlation coefficient 202 in an in-black cell in FIG. 2 is a correlation coefficient that needs to be calculated in order to create the correlation network in FIG. 1.

Conversely, because the correlation coefficient between A1 and B2 is a correlation coefficient that is at or below the threshold, A1 and B2 in FIG. 1 are not connected to each other with a link. For this reason, each correlation coefficient 203 in a not-in-black cell in FIG. 2 is not necessarily indispensable for creating the correlation network in FIG. 1, and it is desirable that the time taken to calculate these correlation coefficients is reduced. However, in the related art, because which correlation coefficients are accordingly not connected with a link is first known as a result of obtaining the correlation coefficients and is not already-known information before the calculation of the correlation coefficients, the reduction in the calculation time cannot be realized in the technology that is disclosed in PTL 2.

With this in mind, an object of the present invention is to provide a technology that extracts a pair of variables that have a large correlation coefficient in less calculation time.

Solution to Problem

Representatives, among means for solving the problem according to the invention in the present application are given as follows. According to an aspect of the present invention, there is provided a data processing system that calculates a correlation variable between multiple variables, the data processing system including: a storage unit in which a table in which multiple correlation coefficients are stored is stored; a first selection unit that makes a selection to determine whether or not calculation of a first correlation coefficient that is a correlation coefficient between a first variable and a second variable is indispensable; a second selection unit that selects a third variable which is a variable that results from storing in the table a second correlation coefficient that is a correlation coefficient representing a relationship with the first variable, and a third correlation coefficient that is a correlation coefficient representing a relationship with the second variable; and a first determination unit that determines whether or not the calculation of the first correlation coefficient is indispensable, based on the second correlation coefficient and the third correlation coefficient.

Furthermore, according to another aspect of the present invention, there is provided a data processing method of calculating a correlation variable between multiple variables, the data processing method including: a step of determining whether or not calculation of a first correlation coefficient that is a correlation coefficient between a first variable and a second variable is indispensable; a step of selecting a third variable that is a variable which results from storing a second correlation coefficient that is a correlation coefficient representing a relationship with the first variable and a third correlation coefficient that is a correlation coefficient representing a relationship with the second variable, in a table in which the multiple correlation coefficients are stored; and a step of determining whether or not the calculation of the first correlation coefficient is indispensable, based on the second correlation coefficient and the third correlation coefficient.

Advantageous Effects of Invention

If an effect that is obtained by a representative among the inventions that are disclosed in the present application is briefly described, a pair of variables that have a large correlation coefficient is described as being able to be extracted in less calculation time.

BRIEF DESCRIPTION OF DRAWINGS

FIG. 1 is a diagram illustrating a relational network.
FIG. 2 is a correlation table.
FIG. 3 is a diagram illustrating a constitution of a system.
FIG. 4 is a flowchart illustrating a total correlation calculation processing.
FIG. 5 is a flowchart illustrating determination of a need to calculate correlation.
FIG. 6 is a variable group table.
FIG. 7 is a normalization variable group table.
FIG. 8 is a correlation result table.
FIG. 9 is a correlation result table.
FIG. 10 is a diagram illustrating a decrease in the number of correlation coefficients using a parameter variable.
FIG. 11 is a diagram illustrating an input and output screen.
FIG. 12 is a diagram illustrating an input and output screen (dynamic update).
FIG. 13 is a flowchart illustrating total correlation calculation processing (dynamic update).

DESCRIPTION OF EMBODIMENTS

First Embodiment

An embodiment of the present invention will be described below referring to the drawings. FIG. 3 is a systemic constitutional diagram illustrating a constitution of the present system. The present system is a server system that is broadly constituted from a central processing device 301, a secondary storage device 310, a main storage device 320, an input device 340, and an output device 350. The central processing device 301 is a processor that executes a program that is stored in the main storage device 320.

Stored within the secondary storage device 310 are a variable group table 312 that is an input for performing correlation calculation in the present system, a normalization variable group table 313 that results from normalizing a variable group table, and a correlation result table 311 in which a result of the correlation calculation is stored. At this point, the secondary storage device 310 is, for example, a magnetic storage device, or a high-capacity non-volatile storage device such as a flash memory. Furthermore, it is also considered that each table which is stored in the secondary storage device 310 is stored in the main storage device 320 and thus access to the table is possible at a higher speed.

The main storage device 320 is a high-speed volatile storage device such as a DYNAMIC RANDOM ACCESS MEMORY (DRAM). An operating system (OS) and an application program are stored in the main storage device 320. A basic function of a calculator is realized by the central processing device, the central processing device 100 executing the operating system, and a function that is provided by the calculator is realized by executing the application program.

Specifically, a total correlation calculation processing unit 330, a parameter selection unit 331, a need-to-calculate-correlation determination unit 332, a correlation calculation unit 333 are stored in the main storage device 320.

The input device 340 is a user interface, such as a keyboard or a mouse. The output device 350 is a user interface, such as a display device or a printer.

Moreover, the program that is executed by the central processing device 301 is provided to the calculator through the non-volatile storage medium or a network. For this reason, the calculator may include an interface for reading a storage medium (a CD-ROM, a flash memory, or the like).

FIG. 4 illustrates a specific flow in the total correlation calculation processing unit 330. In the present system, from each variable that is stored in the variable group table 312, all correlation coefficients, each of which has a correlation coefficient that is at or above a certain threshold TH1, are calculated and correlation coefficients other than these are not calculated if possible, and thus calculation time is greatly accelerated.

The variable group table 312 is a table in which the variables that are calculated in the present system are stored. A specific constitution of the variable group table 312 will be described referring to FIG. 6.

Step 403 is for processing that normalizes each variable in the variable group table 312. This processing is processing for reducing an amount of calculation in subsequent processing by the correlation calculation unit 333, and for the calculation acceleration. In the present processing unit, each variable in the variable group table 312 is normalized to average 0, and distribution 1. Each normalized variable is stored in the normalization variable group table 313. A specific constitution of the normalization variable group table 313 is described below referring to FIG. 7.

At this point, processing that efficiently performs the calculation of correlation between each variable is specifically described. Specifically, when a correlation coefficient IJ between two variables, that is, a variable I and a variable J is calculated for all combinations, a focus is placed on a certain variable K, and thus in a case where it is confirmed that the correlation coefficient IJ is at or below the threshold TH1 of a correlation coefficient that is needed at the current time, it is recorded only that the correlation coefficient IJ is at or below the threshold TH1, without performing the correlation calculation that requires the calculation time. Thus the calculating time is shortened.

At this point, in the present application, it is assumed that the correlation coefficient IJ is a correlation coefficient between the variable I and the variable J. Furthermore, in a case where it is expressed that a certain correlation coefficient is at or below the positive threshold TH1, it is assumed that an absolute value of the correlation coefficient is at or below the threshold TH1. This is because, in a case where the correlation network is set up, whether or not to attach a link is determined in most cases, depending on whether or not an inter-variable relationship is strong. More precisely, not only in a case where an inter-variable correlation is positively strong, but also in a case where the inter-variable correlation is negatively strong, in the same manner, there is an interest and there is a need to perform outputting.

In Step 404, one of a variable of the correlation coefficients that are obtained from this is selected. In the present system, because there is a need to obtain correlation coefficients among all variables, an i-th variable that is selected as the variable I is among all variables from i=0 to i=N. At this point, N is the total number of variables.

Figure 2:
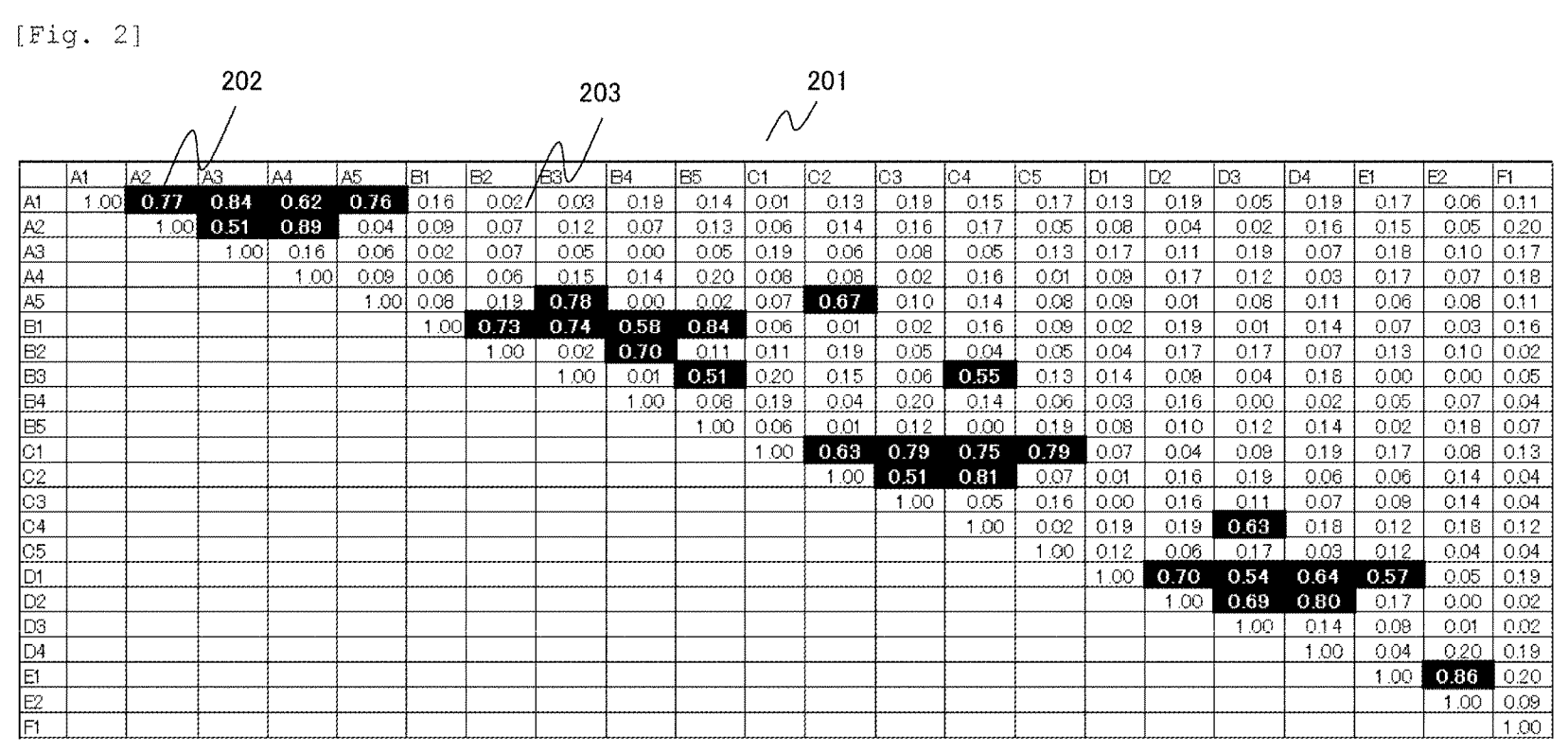

In Step 405, a variable for calculating a coefficient of a correlation with the variable I is selected. At this point, it is understood in advance that a correlation coefficient between each of all variables and itself is 1. Furthermore, because the correlation coefficient IJ is equal to a correlation coefficient JI, correlation coefficients of combinations of all variables are correlation coefficients above the diagonal of a rectangle as illustrated in FIG. 2. Consequently, a j-th variable that is selected as the variable J is in a range from j=i+1 to j=N.

In Step 406, a parameter variable K that is used for determining whether or not there is a need to calculate the correlation coefficient IJ that is described above is selected by the parameter selection unit 331. A condition for the parameter variable K, which has to be satisfied, is that a correlation coefficient IK and a correlation coefficient JK are calculated together. Consequently, a set of K's, with each of which the correlation coefficient IK and the correlation coefficient JK are calculated together, is taken from the correlation result table 311, and K's are selected one by one from the set of K's. Under these circumstances, when it comes to the order in which K's are taken from the set of K's, it is not only possible that K's are taken in random order from, but it is also possible that K's are taken from the set of K's starting with the greatest of the correlation coefficient IK and the correlation coefficient JK. A merit that is obtained by taking K's from the set of K's starting with the largest of the correlation coefficient IK and the correlation coefficient JK is that, in the case where the variable K has a strong correlation with any one of the variable I and the variable J, there is a likelihood that a need-to-calculate-correlation-coefficient IJ determination processing unit 332 on the downstream side will determine that the correlation calculation is unnecessary and, for this reason, will determine with a loop of the small parameter variable K that the calculation of the correlation coefficient IJ is unnecessary.

In Step 407, using the parameter variable K, the need-to-calculate-correlation determination unit 332 determines whether or not the correlation coefficient IJ between the variable I and the variable J is smaller than the threshold TH1, more precisely, whether or not the correlation coefficient IJ may not be calculated on purpose. The determination will be described in detail below referring to FIG. 5. In a case where it is determined that a calculation of a correlation IJ is unnecessary, because it is confirmed that the correlation IJ is smaller than the threshold TH1, a result of the determination is stored in the correlation result table 311. Specifically, as indicated by 804 in the correlation result table 311 in FIG. 8, a symbol "−" meaning that the calculation is omitted is stored, and as a result of ending the determination of whether or not the correlation between the variable I (A2 in FIG. 8) and the variable J (C3 in FIG. 8) needs to be calculated, it is understood that the correlation coefficient is at or below the threshold TH1.

In Step 408, it is determined that all K's in the set of K's are selected. At this point, in a case where all K's are not selected, the determination of whether or not the correlation IJ is needed is repeatedly made, using not-yet-selected K as the parameter variable. On the other hand, in a case where all K's are selected, this means that, although all K's are used, it cannot be asserted that the correlation IJ is smaller than the threshold TH1. Consequently, the correlation coefficient IJ is calculated in the total correlation calculation processing unit on the downstream side. At this point, it should be noted that, while it may be true that although all K's are used, it cannot be asserted that the correlation IJ is smaller than the threshold TH1, the correlation IJ is not necessarily greater than the threshold TH1. For this reason, there is a need to actually calculate the correlation IJ in the correlation calculation unit 333 that will be described. Furthermore, this determination unit 408 may not necessarily select all K's in the set of K's. The reason is that, when the number of K's in the set of K's is too great, a calculation cost for making a determination using all K's in the set of K's is greater than the cost of individually calculating the correlation coefficient IJ. In this case, a method of imposing an upper limit on the number of K's that are determined for the set of K's is also possible. For example, the upper limit on the number of K's for determining (an arithmetic operation cost that is incurred when individually calculating the correlation coefficient IJ)×½ is imposed, and thus in a case where the direct calculation is speedy calculation, it is possible the direct calculation is performed automatically.

In Step 409, with regard to a set with which it cannot be asserted that, although all parameter variables K are used, the correlation coefficient IJ is smaller than the threshold TH1 (or a set with which the determination in Step 408 is discontinued because the upper limit on the number of K's is reached), the correlation calculation unit 333 actually calculates the correlation coefficient. At this point, a correlation relationship between the variable I and the variable J is obtained using the Person's product-moment correlation coefficient. Specifically, with regard to the variable I, the variable J, a correlation coefficient IJ ($=R_{IJ}$) is calculated by performing inner product calculation in Expression (1) that follows. However, $X_I$ and $X_J$ results from vectorizing data portions of the variable I and the variable J, respectively. At this point, it should be noted that $X_I$ and $X_J$ are normalized by prior normalization processing 403 to average 0 and distribution 1.

[Math. 1]

$$R_{IJ}=x_I \cdot x_J=|x_I|\cdot|x_J|\cdot\cos\theta_{IJ}=\cos\theta_{IJ} \qquad \text{Expression (1)}$$

In Step 410, it is determined whether or not all J's are selected, and in a case where all J's are not selected, J that has not yet been selected is selected for return to variable J selection 405. In a case where all J's are selected, Step 411 is performed to determine whether or not all I's are selected.

In Step 411, it is determined whether or not all i's are selected, and in a case where all i's are not selected, a selection is made to return to Step 404. In a case where all I's are selected, a correlation calculation flow is ended.

FIG. 5 is a flow illustrating Step 407 in detail. At this point, when the variable I, the variable J, the parameter variable K, the correlation coefficient IK, and the correlation coefficient JK are given, it is determined whether or not it can be asserted that the correlation coefficient IJ is smaller than the threshold TH1. The rationale behind the fact that it can be asserted from the correlation coefficient IK and the correlation coefficient JK that the correlation coefficient IJ is smaller than the threshold TH1 is described referring to FIG. 10.

Inputs 502 in the present flow are the variable I, the variable J, and the parameter variable K. With respect to these inputs, in Step 503, the correlation coefficient IK and the correlation coefficient JK are acquired with a correlation result 412.

In Step 504, an upper limit angle θ Thmax and a lower limit angel θ Thmin, which are necessary for the correlation coefficient IJ to be greater than the threshold TH1, are obtained with Expressions that follow, respectively, using the threshold TH1 ($=R_{TH1}$) of the correlation coefficient.

[Math. 2]

$$\theta Th\max=\cos^{-1}R_{TH1} \qquad \text{Expression (2)}$$

[Math. 3]

$$\theta Th\min=\pi-\cos^{-1}R_{TH1} \qquad \text{Expression (3)}$$

In Step 505, a sum IJ of correlation angles of the variable I and the variable J is calculated from the correlation coefficient IK (=$R_{IK}$) and the correlation coefficient JK (=$R_{JK}$), as in Expressions that follow.

[Math. 4]

$$\theta_{+IJ} = |\cos^- R_{JK}| + |\cos^- R_{JK}|  \quad \text{Expression (4)}$$

However, in a case where $\theta_{+IJ}$ satisfies Conditional Expression ($\theta_{+IJ} > \pi$), the following conversion ($\theta_{+IJ} = 2\pi - \theta_{+IJ}$) is performed in such a manner as to satisfy a range of $\pi > \theta_{+IJ} > 0$.

In Step 506, a difference IJ in correlation angles between the variable I and the variable J is calculated from the correlation coefficient IK (=$R_{IK}$) and the correlation coefficient JK (=$R_{JK}$), as in Expressions that follow.

[Math. 5]

$$\theta_{-IJ} = ||\cos^{-1} R_{IK}| - |\cos^{-1} R_{JK}||  \quad \text{Expression (5)}$$

In Step 507, it is determined whether or not the correlation coefficient IJ needs to be calculated, using the difference IJ in correlation angles. Specifically, in a case where Conditional Expression (1) is satisfied, because it is confirmed that the correlation coefficient IJ is reliably smaller than the threshold TH1, it is determined that the calculation is unnecessary. In a case where Conditional Expression (1) is not satisfied, proceeding to the determination in Step 508 takes place.

[Math. 6]

$$\theta_{-IJ} \leq \theta Th\min \text{ or } \theta_{-IJ} \geq \theta Th\max  \quad \text{Conditional Expression (1)}$$

In Step 508, it is determined whether or not the correlation coefficient IJ needs to be calculated, using the correlation coefficient IJ. Specifically, in a case where Conditional Expression (2) is satisfied, because it is confirmed that the correlation coefficient IJ is reliably smaller than the threshold TH1, it is determined that the calculation is unnecessary. In a case where Conditional Expression (2) is not satisfied, although the sum of correlation angles and the correlation in correlation angles are used, because it cannot be asserted that the correlation coefficient IJ is smaller than the threshold TH1, it is concluded that the determination is impossible.

[Math. 7]

$$\theta_{+IJ} \leq \theta Th\min \text{ or } \theta_{+IJ} \geq \theta Th\max  \quad \text{Conditional Expression (2)}$$

At this point, the most common flow in the need-to-calculate-correlation determination unit 332 is described, but a configuration is also considered in which, in order to reduce calculation of an inverse function of a cosine function in the Expression (2) and the Expression (3), a result of an inverse function of a cosine function that corresponds to a table other than the correlation result table in which the correlation coefficient is stored is maintained.

FIG. 6 illustrates an example of the variable group table 312. Each column of the table has a portion in which a variable name 601 that is a name of the variable and a portion in which variable data 602 that is data of the variable.

FIG. 7 illustrates the normalization variable group table 312. When it comes to the table, each variable in the variable group table 312 is normalized in Step 403 to average 0 and distribution 1.

FIG. 8 illustrates an example of the correlation result table 311 that is particularly in a state where the calculation is in progress. As described in FIG. 4, the result of the correlation calculation, from which, if possible, unnecessary calculation is excluded, is stored at any time in the correlation result table 311.

For example, an in-black cell such as 802, in which a numerical value is stored, is an example in which the correlation is actually greater than the threshold TH1, as a result of the need-to-calculate-correlation determination unit 332 determining that there is a need for the correlation calculation and of the correlation calculation unit 333 calculating the correlation calculation. However, in the present example, TH1=0.5.

For example, a not-in-black cell such as 803, in which a numerical value is stored, is an example in which the correlation coefficient is actually smaller than the threshold TH1, as a result of the need-to-calculate-correlation determination unit 332 determining that there is the need for the correlation calculation and of the correlation calculation unit 333 calculating the correlation calculation. Illustrations of 802 and 803 are changed in the present drawings for easy-to-understand description, basically, these two results may not be distinguished from each other.

For example, a cell, such as 804, in which the symbol "−" meaning that the calculation is omitted is stored, is an example in which the need-to-calculate-correlation determination unit 332 determines that there is no need for the correlation calculation.

For example, a cell, such as 805, that is empty, is an example in which need-to-calculate-correlation-coefficient determination processing is not performed.

FIG. 9 illustrates an example of the correlation result table that is finally output. The correlation result table 311 in FIG. 9 is basically the same as that in FIG. 8, but in the correlation result table 311, cells, such as 805, for which the processing is not performed, do not remain at the point-in-time when the calculation is ended, and any symbol "−" which means that the correlation calculation is unnecessary for the correlation coefficient is stored in all cells.

FIG. 10 is a diagram illustrating the rationale behind the fact that the number of correlation coefficients is decreased using the parameter variable. The decreasing mentioned here is equivalent to decreasing a range of the unknown correlation coefficient IJ when the correlation coefficient IK and the correlation coefficient JK are given as illustrated in FIG. 10(A). At this point, when returning to the definition of the correlation coefficient, in a case where all variables are normalized to average 0 and distribution 1, the correlation coefficient is equal to an inner product of two variables. Furthermore, because the dispersion is normalized to 1, as illustrated in an example in FIG. 10(A), an inner product of the variable I and the variable K is $\cos \theta_{IK}$ using an angle $\theta_{IK}$ between the variable I and the variable K when viewed from the origin. Now, because the correlation coefficient IK (=$R_{IK}$) and the correlation coefficient JK (=$R_{JK}$) are already known, angle $\theta_{IK} = \cos^{-1}(R_{IK})$ and angle $\theta JK = \cos^{-1}(R_{JK})$ are already known. At this point, because desirably, it is determined whether or the correlation coefficient IJ is smaller than the threshold TH1, a range in which angle $\theta_{IJ}$ can be taken may be known. Because the variable I, the variable J, and the variable K are present on a hypersphere that has the same number of dimensions than a vector of a variable, it should be noted that angle $\theta_{IJ}$ is not uniquely determined from angle $\theta_{IK}$ and angle $\theta_{JK}$. However, in considering a range in which angle $\theta_{IJ}$ is can be obtained, maximum value $\theta\max_{IJ}$ and minimum value $\theta\min_{IJ}$ which can be taken by important angle $\theta_{IJ}$, can be fixed. This is because, in a case where the variable I, the variable J, and the variable K can be freely moved on a hypersphere with angle $\theta_{IK}$ and angle $\theta_{JK}$ being determined, any one of maximum value $\theta max_{IJ}$ and minimum value $\theta min_{IJ}$, is a value that is taken when the value I, the value J, and the variable K are on the same plane including the origin, as illustrated in FIG. 10(B). Consequently, maximum value $\theta max_{IJ}$ and minimum value $\theta min_{IJ}$ are obtained using Expressions that follow, respectively.

[Math. 8]

$$\theta max_{IJ} = |\theta_{IK}| + |\theta_{JK}| \quad \text{Expression (6)}$$

[Math. 9]

$$\theta min_{IJ} = ||\theta_{IK}| - |\theta_{JK}|| \quad \text{Expression (7)}$$

As described above, because maximum value $\theta max_{IJ}$ and minimum value $\theta min_{IJ}$ that are taken by angle $\theta_{IJ}$, are obtained, from the Expression (1), the correlation coefficient IJ can be limited to a value that can be taken by cos $\theta_{IJ}$ when angle $\theta_{IJ}$ moves from the minimum value to the maximum value. Consequently, for all angles $\theta_{IJ}$ that can be taken, if cos $\theta_{IJ}$ is always smaller than threshold TH1, it can be determined that the correlation coefficient IJ is reliably smaller than the threshold TH1. Then, because if this determination is evaluated with two points, that is, the maximum value and the minimum value of angle $\theta_{IJ}$, this is sufficient, it is understood that it can be determined at the two points that the correlation coefficient IJ has the likelihood of exceeding the threshold TH1, only by calculating cos ($\theta max_{IJ}$) and cos ($\theta min_{IJ}$).

With this in mind, a data processing system according to the present embodiment has a storage unit (310) in which a table in which multiple correlation coefficients are stored is stored, a first selection unit (404 and 405) that make a selection to determine whether or not calculation of a first correlation coefficient ($R_{IJ}$) that is a correlation coefficient between a first variable (I) and a second variable (J) is indispensable, a second selection unit (406) that selects a third variable (K) which is a variable that results from storing in the table a second correlation coefficient ($R_{IK}$) that is a correlation coefficient representing a relationship with the first variable, and a third correlation coefficient ($R_{JK}$) that is a correlation coefficient representing a relationship with the second variable, and a first determination unit (407) that determines whether or not calculate the first correlation coefficient, based on the second correlation coefficient and the third correlation coefficient. Furthermore, a data processing method of calculating a correlation coefficient between multiple variables includes steps (404 and 405) of determining whether or not calculation of a first correlation coefficient ($R_{IJ}$) that is a correlation coefficient between a first variable (I) and a second variable is indispensable, a step (406) of selecting a third variable (K) that is a variable which results from storing a second correlation coefficient ($R_{IK}$) that is a correlation coefficient representing a relationship with the first variable and a third correlation coefficient ($R_{JK}$) that is a correlation coefficient representing a relationship with the second variable, in a table in which the multiple correlation coefficients are stored, and a step (407) of determining whether or not calculating the first correlation coefficient based on the second correlation coefficient and the third correlation coefficient.

With this configuration, it is possible that a relational network as illustrated in FIG. 1 is illustrated without actually obtaining the correlation coefficient that it is possible to determine whether or not calculation from an already-known correlation coefficient is indispensable.

FIG. 11 illustrates an example of an input and output screen 1101 in the present system. A correlation network output unit 1102 illustrates a correlation relationship between each variable, rather than a value in the correlation result table, which is calculated. A node 1103 expresses each variable. It is also possible that variable name 601 is expressed at the same time by the node 1103 in such a manner to understand which node expresses which variable. Furthermore, it is also possible that the expressing by the node 1103 is changed according to the importance in the correlation network. For example, it is considered that a node that has many links to other values performs the expressing to a great extent, or performs the expressing with color being changed.

A link 1104 is a line that is drawn between variables in a case where the correlation coefficient between each variable is greater than the threshold TH1. In order to emphasize a size of the correlation coefficient, it is also possible that a thicker link connects between values which have a greater correlation coefficient, and categorizing into several types is performed according to the size of the correlation coefficient and thus the expressing is performed with a type of line being changed.

An input file designation unit 1105 is a portion that designates the variable group table. As an input file, pieces of data in all formats, such as a CSV file, a DB table, and a text file are assumed.

A correlation threshold designation unit 1106 is a portion into which a user can input the threshold TH1 of the correlation coefficient.

A calculation performance button 1107 is a trigger for executing the total correlation calculation processing unit 330 using the threshold TH1 and the input file. When the button is pushed down and the correlation result table 311 is generated, a network is automatically expressed on the correlation network output unit 1102.

A correlation coefficient 1108 is a value of the correlation coefficient between variables between which a link connects.

The first embodiment is as described above. According to the first embodiment, a network diagram that is illustrated in FIG. 11 is assumed with a focus on a result of output to the user, but because the gist of the present invention is that the correlation result table, the correlation coefficients in which are at or above a certain threshold, is output at a high speed, all applications that use the correlation result table, the correlation coefficients in which are at or above the certain threshold, are also targets.

Second Embodiment

A second embodiment of the present invention will be described below referring to the drawings. The second embodiment is an example in which the correlation calculation according to the first embodiment is performed dynamically and to a necessary minimum according to the threshold TH1.

FIG. 12 illustrates an example of an input and output screen (dynamic update). Because a basic constitution of an input and output screen (dynamic update) 1201 is the same as in the case of the input and output screen 1101, a description of the same portion is omitted. A difference with the input and output screen 1101 is a correlation threshold configuration bar 1202.

The correlation threshold configuration bar 1202 is a bar with which the correlation threshold designation unit 1106 is dynamically replaced in the input and output screen 1101. In the input and output screen (dynamic update) 1201, if the user finishing moving the bar, the total correlation calculation processing unit (dynamic update) that is illustrated in FIG. 13 is dynamically executed.

FIG. 13 illustrates a flow in the total correlation calculation processing unit (dynamic update). A description of the same processing as in FIG. 4 is hereinafter omitted. In the present flow, when the threshold TH1 is dynamically updated, basically, the correlation result is used that is calculated in the past. However, the present system omits the calculation of the correlation with regard to a set of variables, a correlation coefficient between which is confirmed to be at or below the threshold. Accordingly, a basic flow of the present flow is that, with regard to the result that is omitted, in a case where new calculation is necessary as a result of dynamically changing a new threshold TH1, calculation is performed.

In Step 1301, the latest threshold TH1 that results from the dynamic change by the user is acquired.

In Step 1302, it is determined whether or not the latest threshold TH1 that results from the dynamic change by the user is greater than the minimum threshold THMIN that is calculated in the past. At this point, in a case where the new threshold TH1 is greater than the minimum threshold THMIN, because the correlation coefficient of which the calculation is omitted in the past is reliably smaller than the new threshold TH1, there is no need to anew perform the calculation. In this case, the calculation is ended and the present flow is ended. In a case where the new threshold TH1 is smaller than the minimum threshold THMIN, because there is a likelihood that a correlation coefficient that is greater than the new threshold TH1 will be present among correlation coefficients of which the calculation is omitted in the past, entering of the flow for the correlation coefficient is performed.

In Step 1304, the correlation coefficient between the variable I and the variable J is acquired from the correlation result table 311.

In Step 1305, it is determined whether or not the calculation of the correlation coefficient IJ that is acquired in Step 1304 has already been completed. In a case where the calculation has already been completed, because there is no need to anew perform the calculation, proceeding to Step 405 takes place. In a case where, in the past calculation, it is confirmed that the new threshold TH1 is smaller than the minimum threshold THMIN and the correlation calculation is omitted, because there is a likelihood that the threshold is smaller than the minimum threshold THMIN and is greater than the new threshold TH1, the determination of the need for the correlation calculation is made again.

In this manner, the data processing system according to the present embodiment, when the threshold is changed, in a case where the post-change threshold is smaller than a minimum value of the correlation coefficient that is stored in the table, a first selection unit is caused to make a selection (1302). By doing this, it is possible that an increase in an amount of calculation when dynamically changing the threshold is suppressed to a minimum.

When the present flow is ended, because it is guaranteed that all correlation coefficients that are greater than the new threshold TH1 are stored in the correlation result table, the past minimum threshold THMIN is replaced with the new threshold TH1 in a Step 1313 of replacing the minimum threshold THMIN.

REFERENCE SIGNS LIST

101: RELATION NETWORK
102: CLUSTER
103: NODE
104: OTHER THAN CLUSTER
201: RELATION TABLE
202: CORRELATION THAT IS AT OR ABOVE THRESHOLD
203: CORRELATION THAT IS AT OR BELOW THRESHOLD
301: CENTRAL PROCESSING DEVICE
310: SECONDARY STORAGE DEVICE
311: CORRELATION RESULT TABLE
312: VARIABLE GROUP TABLE
313: NORMALIZATION VARIABLE GROUP TABLE
320: MAIN STORAGE DEVICE
330: TOTAL CORRELATION CALCULATION PROCESSING UNIT
331: MEDIUM INDICATION SELECTION UNIT
332: NEED-TO-CALCULATE-CORRELATION DETERMINATION UNIT
333: CORRELATION CALCULATION UNIT
340: INPUT DEVICE
350: OUTPUT DEVICE
403 TO 411: STEP
502: INDEX I, INDEX J, INDEX K
503: ACQUISITION OF CORRELATION IK AND CORRELATION JK
504: CALCULATION OF NECESSARY UPPER LIMIT AND LOWER LIMIT ON CORRELATION ANGLE
505: CALCULATION OF SUM IJ OF CORRELATION ANGLES
506: CALCULATION OF DIFFERENCE IJ IN CORRELATION ANGLE
507: DETERMINATION USING DIFFERENCE IN CORRELATION ANGLE
508: DETERMINATION USING SUM OF CORRELATION ANGLES
601: VARIABLE NAME
602: VARIABLE DATA
801: CORRELATION RESULT TABLE
802: RESULT OF CORRELATION THAT IS AT OR ABOVE THRESHOLD
803: RESULT OF CORRELATION THAT IS AT OR BELOW THRESHOLD
804: RESULT OF UNNECESSARY CORRELATION CALCULATION
805: NOT-PERFORMED PROCESSING
901: CORRELATION RESULT TABLE
902: RESULT OF UNNECESSARY CORRELATION CALCULATION
1101: INPUT AND OUTPUT SCREEN
1102: CORRELATION NETWORK OUTPUT UNIT
1103: NODE
1104: LINK
1105: INPUT FILE DESIGNATION UNIT
1106: CORRELATION THRESHOLD DESIGNATION UNIT
1107: CALCULATION PERFORMANCE BUTTON
1108: CORRELATION COEFFICIENT
1201: INPUT AND OUTPUT SCREEN (DYNAMIC UPDATE)
1202: CORRELATION THRESHOLD CONFIGURATION BAR
1203: CALCULATION RE-PERFORMANCE BUTTON
1301 TO 1313: STEP

The invention claimed is:

1. A data processing system that calculates a correlation variable between multiple variables, the data processing system comprising:

a storage unit in which a table in which multiple correlation coefficients are stored is stored;

a first selection unit that makes a selection to determine whether or not calculation of a first correlation coefficient that is a correlation coefficient between a first variable and a second variable is indispensable;

a second selection unit that selects a third variable which is a variable that results from storing in the table a second correlation coefficient that is a correlation coefficient representing a relationship with the first variable, and a third correlation coefficient that is a correlation coefficient representing a relationship with the second variable;

a first determination unit that determines whether or not the calculation of the first correlation coefficient is indispensable, based on the second correlation coefficient and the third correlation coefficient; and an input unit into which a threshold that is at a lower limit of the first correlation coefficient is input, wherein, based on the second correlation coefficient and the third correlation coefficient, the first determination unit determines whether or not there is a likelihood that the first correlation coefficient will exceed the threshold.

2. The data processing system according to claim 1, further comprising:

a calculation unit that calculates the first correlation coefficient in a case where the first determination unit cannot determine that the calculation is unnecessary, wherein the second selection unit further selects a different variable that results from storing in the table a correlation coefficient which is a correlation coefficient representing a relationship with the first variable and a correlation coefficient which is a correlation coefficient representing a relationship with the second variable, and wherein, based on a correlation coefficient of the different variable, the first determination unit further determines whether or not the calculation of the first correlation coefficient is indispensable.

3. The data processing system according to claim 1, wherein, in a case where multiple variables each of which satisfies a condition under which the variable is the third variable are present, the second selection unit selects the multiple variables sequentially, starting from the variable of which the second correlation coefficient is greater or of which the third correlation coefficient is greater.

4. The data processing system according to claim 1, wherein each of the multiple variables is normalized.

5. The data processing system according to claim 1, further comprising:

a second determination unit that causes the first selection unit to make a selection in a case where when the threshold is changed, the post-change threshold is smaller than a minimum value of the correlation coefficient that is stored in the table, wherein the input unit is constituted in such a manner that the threshold is changeable.

6. The data processing system according to claim 1, further comprising:

a display unit on which the multiple variables, the correlation coefficient that exceeds the threshold, among the multiple correlation coefficients, and a link that connects between the multiple variables each of which has the correlation coefficient that exceeds the threshold, are displayed.

7. A data processing method of calculating a correlation coefficient between multiple variables, the data processing method comprising:

determining whether or not calculation of a first correlation coefficient that is a correlation coefficient between a first variable and a second variable is indispensable;

selecting a third variable that is a variable which results from storing a second correlation coefficient that is a correlation coefficient representing a relationship with the first variable and a third correlation coefficient that is a correlation coefficient representing a relationship with the second variable, in a table in which multiple correlation coefficients are stored;

determining whether or not the calculation of the first correlation coefficient is indispensable, based on the second correlation coefficient and the third correlation coefficient; and determining, based on the second correlation coefficient and the third correlation coefficient, whether or not there is a likelihood that the first correlation coefficient will exceed a threshold that is at a lower limit of the first correlation coefficient.

* * * * *